United States Patent [19]

Bryant

[11] 4,336,455

[45] Jun. 22, 1982

[54] SMOKE DETECTORS

[75] Inventor: Jack Bryant, Buckinghamshire, England

[73] Assignee: The Radiochemical Centre Limited, Buckinghamshire, England

[21] Appl. No.: 203,366

[22] Filed: Nov. 3, 1980

Related U.S. Application Data

[63] Continuation of Ser. No. 959,772, Nov. 13, 1978, abandoned.

[30] Foreign Application Priority Data

Nov. 18, 1977 [GB] United Kingdom ............... 48155/77

[51] Int. Cl.[3] ............................................... G01T 1/18

[52] U.S. Cl. .................................... 250/385; 250/381

[58] Field of Search ............... 250/381, 384, 385, 389; 340/629; 313/54

[56] References Cited

U.S. PATENT DOCUMENTS 2,981,840 4/1961 Nahmias .............................. 250/381

4,044,263 8/1977 Ried et al. .......................... 250/381

4,121,105 10/1978 Solomon ............................ 250/381

*Primary Examiner*—Bruce C. Anderson

*Attorney, Agent, or Firm*—Wenderoth, Lind & Ponack

[57] ABSTRACT

The invention relates to smoke detectors of the kind comprising first and second electrodes defining an ionization chamber permitting entry of smoke, said ionization chamber being optionally divided into two regions by a collector electrode, a radioactive source to ionize gas in the ionization chamber and a potential difference applied across the first and second electrodes to cause an ion current to flow, which current is affected by entry of smoke, and provides an auxiliary electrode positioned in the ionization chamber, and means to maintain or create a potential difference between the first electrode and the auxiliary electrode. The auxiliary electrode may be used for testing or for adjustment of sensitivity.

10 Claims, 2 Drawing Figures

SMOKE DETECTORS

This is a continuation application of Ser. No. 959,772, filed Nov. 13, 1978 abandoned.

BACKGROUND OF THE INVENTION

This invention relates to smoke detectors in which a radioactive substance is used in conjunction with one or more ionization chambers. Smoke detectors of this kind, which are well known, include a first electrode and a second electrode defining between them an ionization chamber adapted to allow smoke to enter from the surrounding atmosphere. A radioactive substance emits radiation into the ionization chamber to cause ionization of gas therein. A potential difference is maintained across the two electrodes so as to cause an ion current to flow between them which current is affected by entry of smoke into the ionization chamber. The alteration in ion current can be detected and caused to trigger an alarm.

Detection of this alteration is a problem, and various devices have been proposed to solve it. One device involves division of the chamber into two ionization regions arranged so that the entry of smoke affects the ion current in one but not the other. If one electrode is made common to both ionization regions, then an alteration in one region but not the other alters the potential of the common electrode and this alteration can be detected.

British Standard 5446: Part 1: 1977 provides that smoke detectors intended for use in residential premises must be capable of being tested. Testing without the help of smoke of standard density is somewhat tricky. One device that has been used is a shield which can be moved in front of the radioactive material, but this requires a moving part in an inaccessible place which is somewhat expensive and unsatisfactory. The present invention enables any smoke detector employing the above principles to be tested to ensure correct functioning without requiring any mechanically moving parts in the detector.

SUMMARY OF THE INVENTION

This invention provides in its broadest aspect a smoke detector comprising a first electrode and a second electrode defining between them an ionization chamber adapted to allow smoke to enter from the surrounding atmosphere, a radioactive substance emitting radiation into the ionization chamber to cause ionization of gas therein, and means for maintaining a potential difference across the two electrodes so as to cause an ion current to flow between them which current is affected by entry of smoke into the ionization chamber.

There are provided an auxiliary electrode positioned in the ionization chamber to affect the electric field between the first electrode and the second electrode, e.g. positioned between part of the first electrode and part of the second electrode, and means to maintain continuously or create at will an externally applied potential difference between the first electrode and the auxiliary electrode.

The area of the auxiliary electrode will normally be a small proportion, e.g. from 1% to 20% of the area of the first electrode. The shape, position and area of the auxiliary electrode are not critical, but together determine the effect on the detector of altering the potential of the auxiliary electrode relative to the first electrode, as is more fully described below in relation to a preferred detector design.

This invention also provides a smoke detector comprising an outer electrode, a collector electrode and an inner electrode made of or supporting a radioactive substance, the outer electrode and the collector electrode defining between then an outer ionization region, adapted to allow smoke to enter from the surrounding atmosphere, and the collector electrode and the inner electrode defining between them an inner ionization region, the collector electrode having at least one hole capable of passing therethrough radiation emitted by the radioactive substance so as to produce ionization simultaneously in both ionization regions. Means are provided to maintain a potential difference between the outer electrode and the inner electrode whereby the collector electrode takes up a potential intermediate those of the outer and inner electrodes, which intermediate potential is altered by the entry of smoke particles into the outer ionization region.

There are provided an auxiliary electrode positioned in the outer ionization region to affect the electric field between the outer electrode and the collector electrode, and means to maintain continuously or create at will an externally applied potential difference between the outer electrode and the auxiliary electrode.

BRIEF DESCRIPTION OF THE DRAWINGS

The invention will be further described with reference to the accompanying drawings, in which.

DETAILED DESCRIPTION OF THE INVENTION

Figure 1:
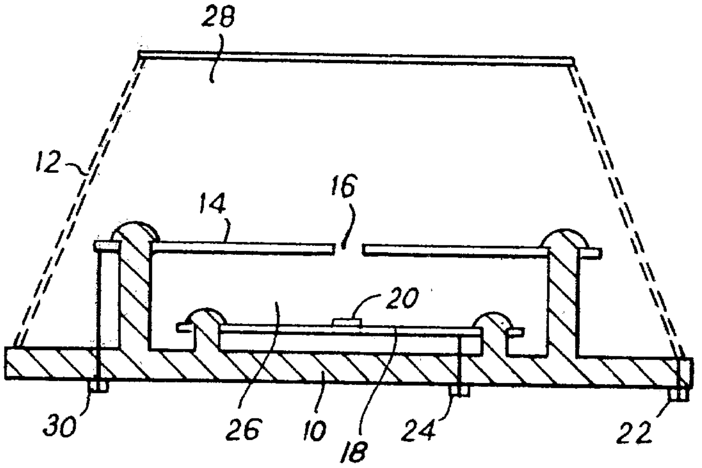
FIG. 1 PRIOR ART
FIG. 1 is an axial cross-sectional view of a prior art detector.

Detectors of the type of the present invention but omitting the auxiliary electrode, are known, and are described for example in British patent specification No. 1,280,304 of Hochiki Corporation. FIG. 1 of the accompanying drawings an shows such a detector. An insulating support 10 carries a domed outer electrode 12, an annular collector electrode 14 with an axial hole 16, and a circular inner electrode 18 at the centre of the top face of which is mounted a radioactive substance 20. The outer electrode 12 is maintained at a potential of 9 volts relative to the inner electrode 18 via terminals 22 and 24 attached respectively to the outer and inner electrodes. The radioactive substance 20 emits radiation which causes ionization of gas in both the inner and outer ionization regions 26 and 28 respectively. Under the applied electric field, the ions migrate to the electrodes and cause an ion current, typically in the range of $10^{-10}$ to $10^{-12}$ Amp, to pass. Under clean air conditions, the collector electrode 14 assumes a potential of, say 5.5 volts. When smoke enters the outer region 28, the smoke particles absorb ions and are too large to migrate rapidly to the electrodes, so that the current is reduced until the potential of the collector has fallen to, say 4.5 volts, the point at which the currents in the outer and inner regions are again in balance. This fall in potential can be detected via terminal 30 by means of standard electronic circuitry such as a field effect transistor, and can be employed to trigger an alarm.

Smoke particles may also enter the inner ionization region 26, but absorb ions in this region only to a limited extent. The detector is designed such that ions in the inner ionization region are collected at the electrodes after only a short passage. Moreover the ions are collected rapidly because the electric field in the inner ionization region is high, and the region operates under essentially saturated ion current conditions, that is to say, such that most of the ions produced by the ionizing radiation in the region are collected at the electrodes; whereas the outer ionization region 28 operates under unsaturated conditions.

We envisage two main uses for the auxiliary electrode. One is for testing purposes as noted above. The other is to adjust the sensitivity of the device after manufacture. The same auxiliary electrode may be used for both purposes. It may conveniently be mounted parallel to and just inside but insulated from the sloping side wall of the outer electrode 12 (see FIG. 1). The area of the auxiliary electrode will normally be a small proporation, e.g. from 1% to 20% of the area of the outer electrode. The shape, position and area of the auxiliary electrode are not critical, but together determine the effect on the detector of altering the potential of the auxiliary electrode relative to the outer electrode. If desired, the auxiliary electrode may be in two or more parts, or may have apertures for the passage of smoke particles.

Figure 2:
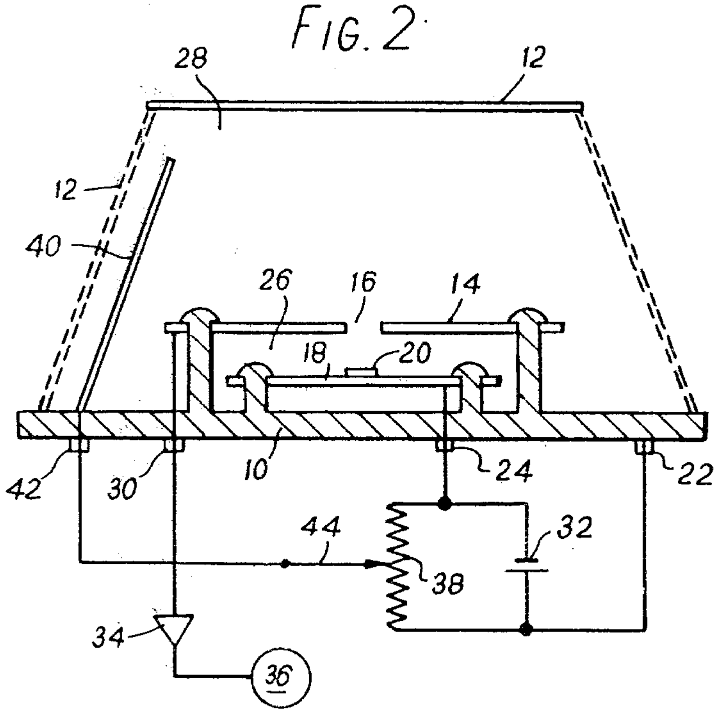
FIG. 2 is an axial cross-sectional view of the detector of the present invention including a diagram of the associated electrical circuit.

The invention will be further described with reference to FIG. 2 of the accompanying drawings, which is an axial cross-section through a detector together with a diagram of the associated electrical circuit. As far as possible, parts are numbered as in FIG. 1.

An insulating support 10 carries a circular domed outer electrode 12, an annular collector electrode 14 with an axial hole 16, and a circular inner electrode 18 at the centre of the top face of which is mounted a radioactive substance 20. The outer electrode 12 is maintained at a potential of 9 volts relative to the inner electrode 18 via terminals 22 and 24, attached respectively to the outer and inner electrodes, by means of a battery 32. The radioactive substance 20 emits radiation which causes ionization of gas in both the inner and outer ionization regions 26 and 28 respectively. The collector electrode 14 is connected via a terminal 30 to an amplifier 34 employing a field effect transistor and thence to an alarm 36.

Connected in parallel with the battery 32 is a potential divider 38. An auxiliary electrode 40 is mounted on the insulating support 10 in a position parallel to, nearly as high as, and just inside the sloping wall of the outer electrode 12. This auxiliary electrode extends round 0.1 of the circumference of the detector. Alternatively, the auxiliary electrode could have had an extension at its upper end towards the axis of the detector. The auxiliary electrode is connected via a terminal 42 to the variable arm 44 of the potential divider 38.

For testing purposes, the auxiliary electrode 40 is normally maintained at the same potential as the outer electrode 12. A person desiring to test the detector moves the side arm 44 to bring the auxiliary electrode to the same potential as the inner electrode 18 (or if desired to some predetermined potential intermediate these two). The auxiliary electrode 40 then competes with the collector electrode for ions, and also alters the electric field distribution in the outer ionization chamber. Either or both of these effects reduce the ion current between the outer electrode 12 and the collector electrode 14, and hence increases the potential difference between these two to the point at which the alarm 36 is triggered. In designing such a detector, it is a routine matter to make the auxiliary electrode of such size and shape as to have the desired effect on the potential of the collector electrode.

A problem arises because, if the auxiliary electrode 40 is switched quickly from electrical connection with the outer electrode 12 to the inner electrode 18, a short voltage surge will be induced on the collector electrode 14 which may be sufficient to trigger the alarm 36. One way of avoiding this is to move the side arm 44 slowly from its lowest to its top position, say over a period of a few seconds. Alternatively, if it is desired to perform the test by means of a springloaded button, the button may have to be held down for a few seconds and conventional electrical circuitry used to damp the voltage surge.

The other possible function of the auxiliary electrode is to adjust the sensitivity of the detector. In the example noted above, the collector electrode 14 is designed to be maintained under clean air conditions at a potential of 5.5 volts, relative to the inner electrode, and to trigger the alarm if this voltage should fall to 4.5 volts. To achieve the required steady state it is necessary to manufacture the detector to close dimensional tolerances, and this may be difficult in mass production. For example, the distance between the radioactive source 20 and the hole 16 in the collector electrode is quite critical and an error of 0.1 mm can make an appreciable difference to the ratio of ionization response in the outer and inner ionization regions and hence to the potential of the collector electrode. So small variations in manufacture are liable to give rise to large variations in sensitivity.

An auxiliary electrode of the kind described can be used to adjust the sensitivity of the detector by moving the side arm 44 of the potential divider 38 to a point at which the alarm is triggered at the desired smoke density. The potential divider so adjusted can subsequently be used to test the proper functioning of the detector in situ as previously described, provided that the side arm is afterwards replaced at its initial position.

The strength of the radioactive source should be as low as possible consistent with generating a steady measurable ion current. If the radioactive source is too weak, the potential of the collector electrode is liable to wobble about its mean value, with the risk that the alarm may be triggered when there is no fire. We prefer to use from 0.01 to 10, particularly from 0.1 to 1, micro Curies of radioactive material. $\alpha$-Particle sources are conventionally provided in the form of a foil with a thin surface layer of gold to provide abrasion and corrosion resistance. This protective layer does, however absorb some of the radiation emergy, typically, when using Americium 241 as the radioactive material, 20% of the energy of $\alpha$-particles emerging at 90° to the surface of the foil and an increasing percentage as the angle of emergence decreases. It follows that $\alpha$-particles emitted at high angles to the surface of the foil travel further than those emitted at low angles and are principally responsible for causing ionization in the outer ionization chamber. To minimise the pressure dependence of the detector, it is preferred that the distance of the outer electrode from the radioactive source be not more than half the mean range of the $\alpha$-particles under clean air conditions.

For some radioactive sources emitting ionizing radiation, for example, $\beta$-particles, conversion electrons, auger electrons, or X-rays as well as $\alpha$-particles, it may be possible to cover the one or more holes in the collector electrode with a membrane thin enough to permit the radiation to pass.

The detectors of this invention may be designed according to known criteria: to minimise the effect of variations of atmospheric pressure and temperature; to trigger an alarm at a predetermined elevated temperature even in the absence of smoke; to prevent emission of radiation into the surrounding atmosphere. Electronic circuitry for use with such detectors is well known and will not be further described here.

I claim:

1. A smoke detector comprising:

first and second electrodes positioned to define therebetween an ionization chamber;

a radioactive substance positioned for emitting radiation into said ionization chamber for causing ionization of a gas therein;

first means for maintaining a potential difference across said first and second electrodes for causing an ion current to flow therebetween, said current being caused to vary when smoke enters said ionization chamber;

second means for testing the detector or for adjusting its sensitivity, said second means comprising an auxiliary electrode located in said ionization chamber for affecting the electric field between said first and second electrodes; and third means for creating, controlling and varying an externally applied potential difference between said first electrode and said auxiliary electrode.

2. A smoke detector as claimed in claim 1, wherein the area of said auxiliary electrode is approximately from 1% to 20% of the area of said first electrode.

3. A smoke detector comprising:

an outer electrode;

a collector electrode;

an inner electrode made of or supporting a radioactive substance thereon;

said outer electrode being located with respect to said collector electrode so as to define therebetween an outer ionization region capable of allowing smoke to enter therein from the surrounding atmosphere;

said collector electrode and said inner electrode being located with respect to each other so as to define therebetween an inner ionization region;

said collector electrode having at least one hole for allowing radiation from said radioactive substance to pass therethrough for causing ionization in both said ionization regions;

first means for maintaining a potential difference between said outer electrode and said inner electrode, whereby said collector electrode acquires a potential which is intermediate the potentials of said outer and inner electrodes, said intermediate potential being caused to vary by entry of smoke particles into said outer ionization region;

second means for testing the detector or for adjusting its sensitivity, said second means comprising an auxiliary electrode located in said outer ionization region for affecting the electric field between said outer and collector electrodes; and third means for creating, controlling and varying an externally applied potential difference between said outer electrode and said auxiliary electrode.

4. A smoke detector as claimed in claim 3, wherein said auxiliary electrode is mounted parallel to and just inside, but insulated from, said outer electrode.

5. A smoke detector as claimed in claim 4, wherein the area of said auxiliary electrode is approximately from 1% to 20% of the area of said outer electrode.

6. A smoke detector as claimed in claim 3, wherein said auxiliary electrode is normally maintained at the same potential as said outer electrode, and further comprising means for testing purposes for bringing said auxiliary electrode to a predetermined potential different from that of said outer electrode.

7. A smoke detector as claimed in claim 6, further comprising means for avoiding a voltage surge on said collector electrode when the potential of said auxiliary electrode is altered.

8. A smoke detector as claimed in claim 3, further comprising means for adjusting the potential of said auxiliary electrode so that an alarm or positive response of the detector is triggered at a desired smoke density.

9. A smoke detector as claimed in claim 1 or claim 3, wherein said radioactive source has an activity of from 0.1 to 1 micro Curie.

10. A smoke detector as claimed in claim 1 or claim 3, wherein said radioactive source emits alpha-particles, beta-particles, conversion electrons, auger electrons or X-rays.

* * * * *

Disclaimer and Dedication 4,336,455.—*Jack Byrant,* Buckinghamshire, England. SMOKE DETECTORS. Patent dated June 22, 1982. Disclaimer and Dedication filed Aug. 19, 1987, by the assignee, Amersham International, Ltd.

Hereby disclaims and dedicates to the Public the entire term of said patent.

[ *Official Gazette December 18, 1990* ]